United States Patent
Kreitzer

(10) Patent No.: US 6,853,493 B2
(45) Date of Patent: Feb. 8, 2005

(54) FOLDED, TELECENTRIC PROJECTION LENSES FOR USE WITH PIXELIZED PANELS

(75) Inventor: Melvyn H. Kreitzer, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/337,959

(22) Filed: Jan. 7, 2003

(65) Prior Publication Data

US 2004/0130799 A1 Jul. 8, 2004

(51) Int. Cl.$^7$ ............... G02B 3/00; G02B 13/22; G02B 17/00; G03B 21/26
(52) U.S. Cl. ............ 359/651; 359/663; 359/679; 359/726; 359/753; 353/31; 353/37; 353/77
(58) Field of Search ............... 359/649–651, 359/663, 679, 680, 682, 717, 726, 749–753; 353/20, 30, 31, 34, 37, 77, 74

(56) References Cited

U.S. PATENT DOCUMENTS

| | | |
|---|---|---|
| 4,526,442 A | 7/1985 | Betensky |
| 5,042,929 A | 8/1991 | Tanaka et al. |
| 5,218,480 A | 6/1993 | Moskovich |
| 5,390,048 A | 2/1995 | Miyatake et al. |
| 5,442,484 A | 8/1995 | Shikawa |
| 5,467,154 A | 11/1995 | Gale et al. |
| 5,539,579 A | 7/1996 | Miyatake et al. |
| 5,625,495 A | 4/1997 | Moskovich |
| 5,692,820 A | 12/1997 | Gale et al. |
| 5,760,965 A | 6/1998 | Kim |
| 5,812,326 A | 9/1998 | Yamada |
| 5,870,228 A | 2/1999 | Kreitzer et al. |
| 5,900,987 A * | 5/1999 | Kreitzer ............... 359/649 |
| 6,144,503 A | 11/2000 | Sugano |
| 6,169,636 B1 * | 1/2001 | Kreitzer ............... 359/691 |
| 6,188,523 B1 | 2/2001 | Choi |
| 6,195,209 B1 * | 2/2001 | Kreitzer et al. ............ 359/649 |
| 6,220,713 B1 * | 4/2001 | Tadic-Galeb et al. ........ 353/77 |
| 6,324,014 B1 | 11/2001 | Moskovich |
| 6,563,650 B2 * | 5/2003 | Moskovich ............... 359/663 |

FOREIGN PATENT DOCUMENTS

| | | |
|---|---|---|
| WO | WO 02/069013 A1 | 9/2002 |
| WO | WO 02/071124 A1 | 9/2002 |

OTHER PUBLICATIONS

Zemax Development Corporation's documentation entitled "GHO—Ghost Image Analysis," San Diego, California, 9–49 through 9–54 and 9–61 through 9–76, published prior to January 7, 2003.

* cited by examiner

Primary Examiner—Evelyn A. Lester

(57) ABSTRACT

Projection lenses for use with pixelized panels (PP) are provided. The projection lenses have a negative first unit (U1) separated from a positive second unit (U2) by a reflective surface (RS) which folds the lens' optical axis. The lenses are telecentric on the short conjugate side, have a large field of view in the direction of the long conjugate, and have low aberration levels, including, in particular, low levels of lateral color.

20 Claims, 3 Drawing Sheets

FOLDED, TELECENTRIC PROJECTION LENSES FOR USE WITH PIXELIZED PANELS

FIELD OF THE INVENTION

This invention relates to projection lenses and, in particular, to folded, telecentric projection lenses for use in forming an image of an object composed of pixels, such as, a DMD, a reflective LCD, a transmissive LCD, or the like.

DEFINITIONS

As used in this specification and in the claims, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity.

In practical applications, a telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have a pupil at a long distance from the lens' elements, and the term "telecentric pupil" is used to describe such a pupil at a long distance from the lens' elements. For the projection lenses of the invention, the telecentric pupil distance will in general be at least about 20 times the lens' focal length.

(2) Effective Back Focal Length

The effective back focal length (BFL) of a projection lens/pixelized panel combination is the distance between the front surface of the pixelized panel and the vertex of the back surface of the rearward-most lens element of the projection lens which has optical power when (1) the image of the pixelized panel is located at infinity and (2) the projection lens is located in air, i.e., the space between the rearward-most lens element of the projection lens and the pixelized panel is filled with air as opposed to the glasses making up the prisms, beam splitters, etc. normally used between a projection lens and a pixelized panel.

BACKGROUND OF THE INVENTION

A. Projection Systems

Projection systems are used to form an image of an object on a viewing screen. Such systems can be of the front projection or rear projection type, depending on whether the viewer and the object are on the same side of the screen (front projection) or on opposite sides of the screen (rear projection).

The basic structure of such a system is shown in FIG. 4, where 10 is a light source (e.g., a metal halide or a high pressure mercury vapor lamp), 12 is illumination optics which forms an image of the light source (the "output" of the illumination system), 14 is the object which is to be projected (i.e., for the lenses of the present invention, a matrix of on and off pixels), and 13 is a projection lens, composed of multiple lens elements, which forms an enlarged image of object 14 on viewing screen 16.

For front projection systems, the viewer will be on the left side of screen 16 in FIG. 4, while for rear projection systems, the viewer will be on the right side of the screen. For rear projection systems which are to be housed in a single cabinet, one or more mirrors are often used between the projection lens and the screen to fold the optical path and thus reduce the system's overall size.

Projection systems in which the object is a pixelized panel (also known in the art as a "digital light valve" or a "microdisplay") are used in a variety of applications. Such systems preferably employ a single projection lens which forms an image of a single panel used to produce (either sequentially or simultaneously) the red, green, and blue components of the final image or, in some cases, an image of three panels, one for red light, a second for green light, and a third for blue light. For certain applications, e.g., large image rear projection systems, multiple panels and multiple projection lenses are used, with each panel/projection lens combination producing a portion of the overall image. Irrespective of the details of the application, the projection lens generally needs to have a long effective back focal length to accommodate the prisms, beam splitters, and other components normally used with pixelized panels.

A particularly important application of projection systems employing pixelized panels is in the area of rear projection systems which can used as large screen projection televisions (PTVs) and/or computer monitors. Improvements in the technology used to manufacture microdisplays has led to a rise in the popularity of projection systems employing such displays. To compete effectively with the established cathode ray tube (CRT) technology, projection systems based on microdisplays need to be smaller in size and lower in weight than CRT systems having the same screen size.

B. Optical Performance

To display images having a high information content (e.g., to display data), a microdisplay must have a large number of pixels. Since the devices themselves are small, the individual pixels are small, a typical pixel size ranging from 17 $\mu$ for DMD displays to approximately 8 $\mu$ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center.

Moreover, projection lenses are often used with offset panels. In particular, in the case of DMDs, an offset is typically needed to provide the appropriate illumination geometry and to allow the dark-field light to miss the entrance pupil of the lens. This dark-field light corresponds to the off position of the pixels of the DMD.

When a panel is offset, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In addition to high levels of color and distortion correction, projection lenses for use with pixelized panels need to have low levels of ghost generation, especially when the pixelized panel is of the reflective type, e.g., a DMD or reflective LCD.

As known in the art, ghosts can be generated by image light reflecting back towards the object from one of the lens surfaces of a projection lens. Depending upon the shape of the lens surface and its location relative to the object, such reflected light can be re-reflected off of the object so that it reenters the projection lens and is projected onto the screen along with the desired image. Such ghost light always reduces contrast at least to some extent. In extreme cases, a second image can actually be seen on the screen.

Because the operation of DMDs and reflective LCDs depend upon their ability to reflect light efficiently, projection systems employing panels of these types are particularly susceptible to ghost problems. Ghosts can also be generated by light reflecting backwards off of one lens surface and then being re-reflected in a forward direction by a second lens surface. When reflective pixelized panels are used, ghosts generated by reflections from two lens surfaces are generally less troublesome than ghosts generated by a lens surface/pixelized panel combination.

C. Telecentricity

The above-mentioned pixelized panels and, in particular, DMDs, typically require that the light beam from the illumination system has a near normal angle of incidence upon the display.

In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the aperture stop which makes the correction of lateral color more difficult.

D. Cabinet Size

For rear projection systems, there is an ever increasing demand for smaller cabinet sizes (smaller footprints).

In terms of the projection lens, this translates into a requirement that the lens has a wide field of view in the direction of the image (screen). Increases in the field of view from, for example, 82° to, for example, 88°, can be of substantial significance to manufacturers of projection televisions. This is so because such an increase in the field of view of the projection lens can allow the TV manufacturer to reduce the dimensions of its cabinet by an inch or more. A smaller cabinet, in turn, makes a projection television more desirable in the highly competitive consumer market for PTVs.

The requirement for a large field of view makes it even more difficult to correct the lateral color of the lens. This is especially so when combined with the requirement for a long effective back focal length which itself makes it more difficult to correct lateral color. Also, as mentioned above, the requirement for telecentricity is a third factor which makes the correction of lateral color challenging.

In addition to increasing the field of view, cabinet sizes can also be reduced through the use of a folded projection lens, i.e., a lens having an internal reflective surface (e.g. a mirror or prism) which allows the lens to have an overall form which is easier to integrate with the other components of the projection system and is more compact. In terms of lens design, the use of such a reflective surface means that two of the lens units making up the projection lens must be separated by a distance which is sufficiently long to receive the reflective surface. A construction of this type makes it more difficult to correct the aberrations of the system, especially if the lens is to include only a small number of lens elements as is desired to reduce the cost, weight, and complexity of the projection lens.

Achieving a long back focal length, a wide field of view in the direction of the lens' long conjugate, telecentricity, and a folded configuration, while still maintaining high levels of aberration correction and low levels of ghost generation, is particularly challenging since these various requirements tend to work against one another. To do so while minimizing the number of lens elements used in the lens is even more demanding. As discussed and illustrated below, the present invention provides projection lenses which satisfy these conflicting criteria.

SUMMARY OF THE INVENTION

In view of the foregoing, there exists a need in the art for projection lenses for use with pixelized panels which have some and preferably all of the following properties:

(1) a high level of lateral color correction, including correction of secondary lateral color;
(2) low distortion;
(3) a large field of view in the direction of the image;
(4) a telecentric entrance pupil;
(5) a long effective back focal length;
(6) a folded configuration;
(7) a low level of ghost generation; and
(8) a low element count.

To satisfy this need in the art, the invention provides projection lenses which have some and preferably all of the above eight features.

In particular, the invention provides a projection lens for forming an enlarged image of a pixelized panel on a screen, said projection lens having an optical axis, a long conjugate side (image or screen side), a short conjugate side (object or pixelized panel side), and an effective focal length $f_0$, said lens comprising the following in order from the long conjugate side to the short conjugate side:

(A) a first lens unit (U1) having a negative power and comprising a plurality of lens elements, wherein:
  (i) one of the lens elements $L_M$ is a negative lens element of overall meniscus shape which is convex towards the long conjugate side and comprises at least one aspheric surface; and
  (ii) another of the lens elements (e.g., lens element $L_3$) has an optical surface $S_1$ which constitutes the short conjugate end of the first lens unit;
(B) a reflective surface (RS) for folding the projection lens' optical axis (e.g., a mirror or prism which produces a fold in the optical axis in the range of, for example, 60–70°, e.g., approximately 64°); and
(C) a second lens unit (U2) having a positive power and comprising a plurality of lens elements, wherein:
  (i) one of the lens elements $L_A$ is a positive lens element which comprises at least one aspheric surface; and
  (ii) another of the lens elements (e.g., $L_4$) has an optical surface $S_2$ which constitutes the long conjugate end of the second lens unit;
  wherein:
    (a) the first and second lens units are the only lens units of the projection lens;
    (b) the projection lens has a field of view in the direction of the long conjugate which is greater than 82 degrees and preferably greater than or equal to 85 degrees (e.g., a field of view of 88 degrees);
    (c) the projection lens is telecentric on the short conjugate side;
    (d) the projection lens has an effective back focal length BFL which satisfies the relationship:

$BFL/f_0 > 2.0;$ (e) the projection lens has a mechanical spacing $S_{1-2}$ between $S_1$ and $S_2$ which satisfies the relationship:

$S_{1-2}/f_0 > 3.5,$ where the mechanical spacing is the smaller of the center-to-center distance and the edge-to-edge distance between $S_1$ and $S_2$ for an unfolded optical axis; and
    (f) the projection lens has a lateral color LC in its short conjugate focal plane which satisfies the relationships:

$LC_{red-blue} < 0.0012 \cdot f_0$ (preferably $<0.001 \cdot f_0$), $LC_{red-green} < 0.0012 \cdot f_0$ (preferably $<0.001 \cdot f_0$), and $LC_{blue-green} < 0.0012 \cdot f_0$ (preferably $<0.001 \cdot f_0$), where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.62 micrometers, 0.55 micrometers, and 0.46 micrometers, respectively.

Preferably, the BFL/$f_0$ ratio is greater than 2.5. Similarly, the $S_{1-2}/f_0$ ratio is preferably greater than 4.0 and most preferably greater than 4.5.

Also, in addition to providing a large space between the short conjugate end of the first lens unit and the long conjugate end of the second lens unit, the projection lenses of the invention also preferably provide a large space between the short conjugate end of first lens unit (i.e., the $S_1$ surface) and the projection lens' aperture stop. In particular, the spacing $S_{1-AS}$ between the center of optical surface $S_1$ and the center of the aperture stop preferably satisfies the relationship:

$S_{1-AS}/f_0 > 3.5.$

It should be noted that the projection lens can have a physical aperture stop or can use the output of the illumination system as a virtual aperture stop. In either case, the aperture stop is preferably on the short conjugate side of the reflective surface. Alternatively, but less preferred, the aperture stop can be located at the reflective surface, e.g., an aperture stop can be applied to or painted onto the reflective surface. Note that for the projection lens to operate efficiently, the aperture stop should either completely clear the reflective surface or should be completely on the reflective surface, i.e., the reflective surface should not intersect and thus cut off a part of the aperture stop.

Although an aperture stop on the long conjugate side of the reflective surface can be used in the practice of the invention, such a location for the aperture stop is generally not preferred since the second lens unit then must have a long focal length to produce a telecentric entrance pupil for the overall lens.

In terms of distortion, the projection lenses of the invention preferably have a percentage distortion D which:
  (i) over the full field has a magnitude that is less than 1.0 (i.e., at all points of the field the magnitude of the distortion is less than 1.0%); and
  (ii) over the half field-to-full field range has a maximum value $D_{max}$ and a minimum value $D_{min}$ which satisfy the relationship:

$|D_{max} - D_{min}| < 0.4.$

The second of these criteria for a high level of distortion correction is directed to the phenomenon known as "apparent distortion." When looking at an image on a screen, users are particularly sensitive to curvature along the top or bottom of the image. Such curvature will arise if the distortion varies between, for example, the middle of the top of the screen to the edges of the top of the screen. For a typical 16:9 format, the middle of the top of the screen corresponds to the half field of view and the edges of the top of the screen correspond to the full field of view. By keeping the variation in percentage distortion over this range below 0.4, the problem of apparent distortion is avoided.

Preferably, the projection lenses of the invention achieve the above features of the invention with less than eight lens elements. Most preferably, two of the lens elements are in the form of a doublet so that assembly of the lens requires positioning of less than seven lens components.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention.

Figure 1:
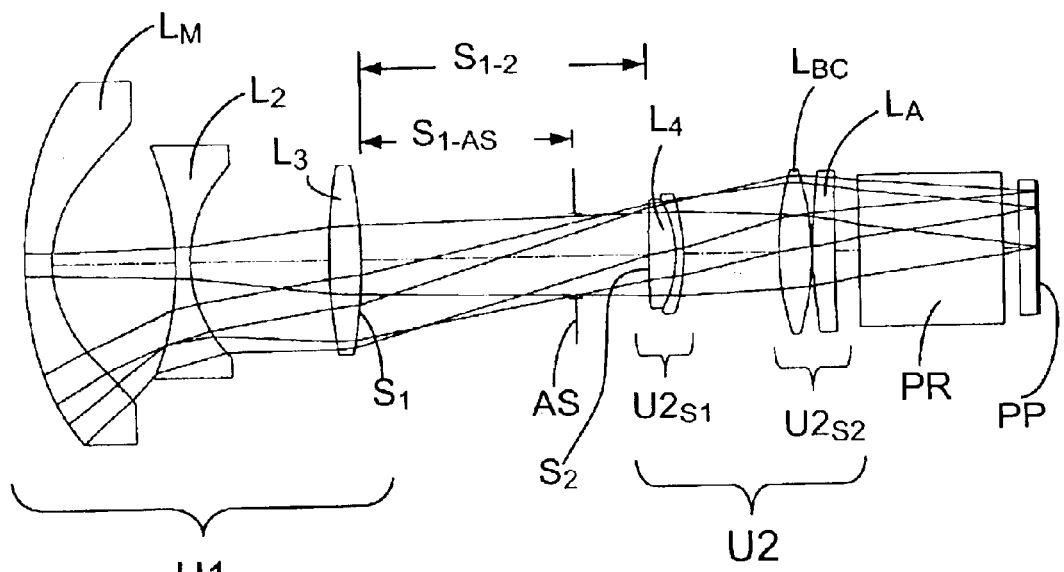
FIGS. 1, 2, and 3A are schematic side views of representative projection lenses constructed in accordance with the invention in an unfolded configuration.

The foregoing drawings, which are incorporated in and constitute part of the specification, illustrate the preferred embodiments of the invention. As with the written description, these drawings are explanatory only and should not be considered as restrictive of the invention.

DESCRIPTION OF THE PREFERRED EMBODIMENTS

The projection lenses of the present invention are of the retrofocus or the inverted telephoto type and consist of two lens units, i.e., a negative unit (U1) on the long conjugate side and a positive unit (U2) on the short conjugate side, which are separated by a physical or virtual aperture stop.

The use of this overall lens form to produce an image of a pixelized panel has various advantages. Thus, telecentricity can be achieved by locating the lens' aperture stop in the front focal plane of the second positive unit. Additional advantages, illustrated by the examples presented below, are the ability to achieve a long effective back focal length and the ability to provide a wide field of view in the direction of the lens' long conjugate. As discussed above, both of these characteristics are particularly useful in rear projection systems, where the lens must have a wide field of view to achieve the smallest possible overall package size, and where there is a need to accommodate beam splitting prisms and/or beam guiding prisms between the lens and the pixelized panel. These prisms may include TIR prisms, polarizing beam splitters, and/or color splitting prisms.

The lenses of the invention achieve a high level of distortion correction by using one or more aspherical surfaces in the first lens unit. Specifically, the $L_M$ lens element has one and preferably two aspherical surfaces. The variation of thickness of the $L_M$ lens element is preferably minimized to reduce the molding time and thus the cost of that element. In particular, $L_M$ preferably has a center thickness $t_c$ and an edge thickness $t_e$ which satisfy the relationship:

$$t_e/t_c < 3.0,$$

where $t_e$ is determined at the clear aperture of the short conjugate surface of $L_M$ (i.e., surface 2 in Tables 1–3).

Some residual distortion, as well as spherical aberration of the lens' entrance pupil, is corrected through the use of one or more aspherical surfaces in the second lens unit. The spherical aberration of the entrance pupil should be minimized to achieve telecentricity for any arbitrary point in the object plane of the lens. Preferably, the aspherical surfaces of the first and second lens units are formed on plastic lens elements.

The most critical aberration that must be corrected is the lens' lateral color. The lenses of the invention preferably achieve such correction using anomalous dispersion glasses (also known as "abnormal partial dispersion" glasses) as discussed in U.S. Pat. No. 5,625,495, entitled "Telecentric Lens Systems For Forming an Image of an Object Composed of Pixels," and/or by using the techniques of U.S. Pat. No. 6,195,209, entitled "Projection Lenses Having Reduced Lateral Color for Use with Pixelized Panels," the contents of both of which are incorporated herein by reference.

As illustrated by the examples set forth below, the abnormal partial dispersion of acrylic can in some cases be sufficient to provide lateral color correction, including secondary lateral color correction, without the need for anomalous dispersion glasses. In particular, this can be the case if the $L_M$ lens element is composed of acrylic and has a sufficiently strong negative power.

The prescription of Table 3 illustrates such a projection lens in which lateral color correction is achieved through the use of a sufficiently strong $L_M$ element composed of acrylic. However, the $t_e/t_c$ ratio for the $L_M$ lens element of this prescription is greater than 3 (specifically, 3.8), which makes the element expensive to mold due to the need for long molding cycle times. The $L_M$ lens elements of the projection lenses of Tables 1 and 2, on the other hand, have $t_e/t_c$ ratios that are less than 3 (specifically, 2.8 for Table 1 and 2.9 for Table 2), and thus can be molded economically. These lens elements have less negative power than the $L_M$ lens element of Table 3. Accordingly, the prescription of Table 1 uses two lens elements composed of anomalous dispersion glass in the second lens unit (i.e., elements $L_4$ and $L_{BC}$ which are composed of OHARA S-FPL51 glass), while the prescription of Table 2 uses one such element (i.e., element $L_{BC}$ which again is composed of S-FPL51 glass). Other anomalous dispersion glasses besides S-FPL51 can, of course, be used in the practice of the invention.

As discussed above, the use of reflective pixelized panels can exacerbate the problem of ghost formation since such panels are designed to reflect light. In accordance with the invention, it has been found that this problem can be readily addressed during the lens design process by ensuring that the axial marginal ray traced through the projection lens from the projection lens' short conjugate focal plane intersects each lens surface of the projection lens at an angle of incidence θi that is greater than 1.5 degrees.

For example, a constraint of this type can be incorporated in the lens design computer program at the beginning of the design process. Alternatively, as a lens design is being developed, the shape of offending surfaces can be changed to meet this criterion. Because the height of the axial marginal ray tends to be small at the long conjugate end of the lens, the angle of incidence of that ray with the lens surfaces of the $L_M$ lens element and any lens surfaces which may be on the long conjugate side of $L_M$ need not be greater than 1.5 degrees, i.e., θi may be less than, equal to, or greater than 1.5 degrees for these surfaces. Typically, the $L_M$ lens element constitutes the long conjugate end of the projection lens so that only the $L_M$ lens element is excluded from the θi>1.5 degrees criterion.

The prescription of Table 3 illustrates this aspect of the invention. The smallest θi for lens elements $L_2$ through $L_A$ for this example is 1.54°, while for the $L_M$ lens element, it is 0.82°. This projection lens was built and tested, and found to have very good ghost performance.

For a rear projection television, the distance to the screen is known and thus gross changes in the focus of a projection lens are not normally required. However, to take account of manufacturing tolerances, small focus adjustments are routinely made during the process of assembling a projection lens into a rear projection television. To facilitate that process, the projection lenses of the present invention provide two mechanisms for focus adjustment.

Specifically, the second lens unit preferably comprises two lens subunits ($U2_{S1}$ and $U2_{S2}$), with the first lens subunit being on the long conjugate side of the second lens unit and the second lens subunit being on the short conjugate side. With this structure, focusing can be done by moving either the entire second lens unit or just the second lens subunit.

Without intending to limit it in any manner, the present invention will be more fully described by the following examples.

EXAMPLES

Figure 2:
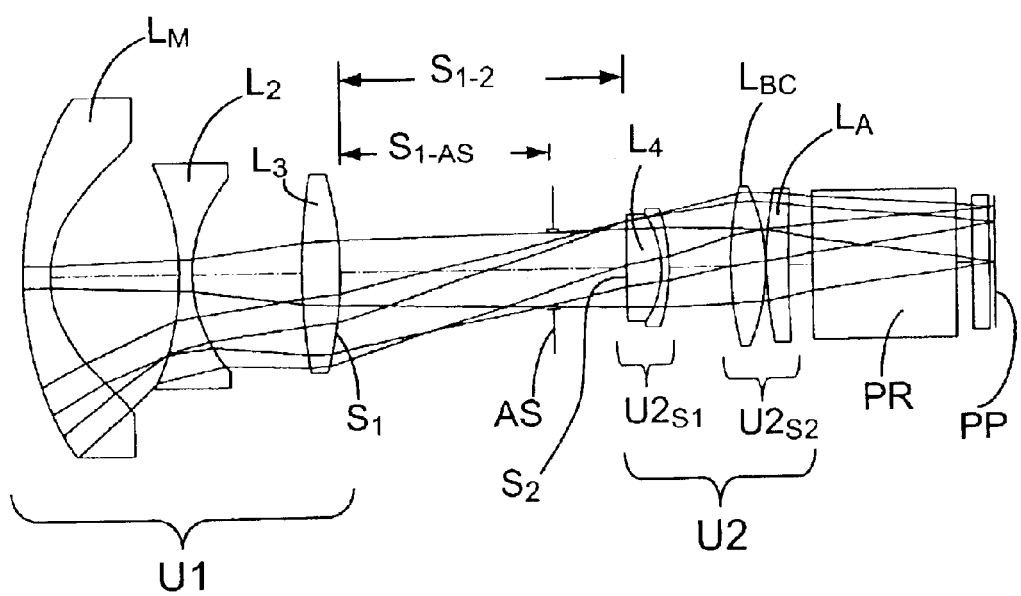
Figure 3A:
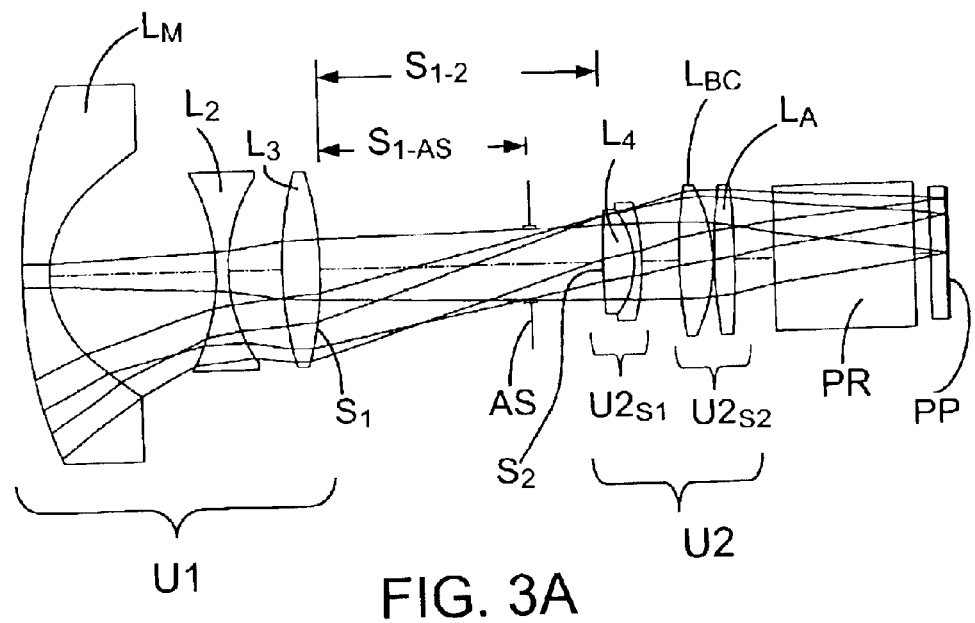
Figure 3B:
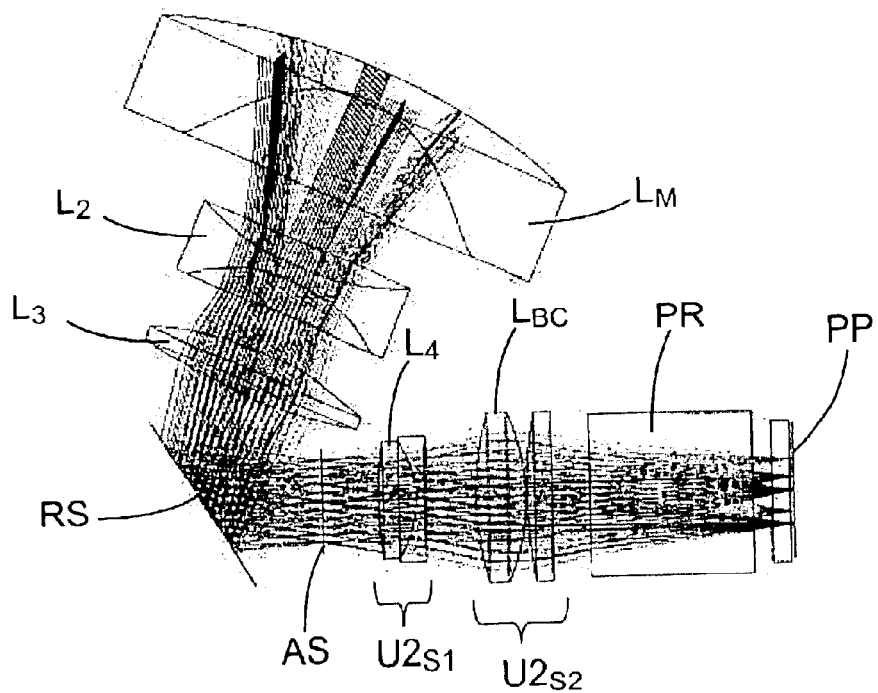
FIG. 3B is a schematic side view of the projection lens of FIG. 3A in its folded configuration. During use, the projection lenses of FIGS. 1 and 2 are similarly folded.
Figure 4:
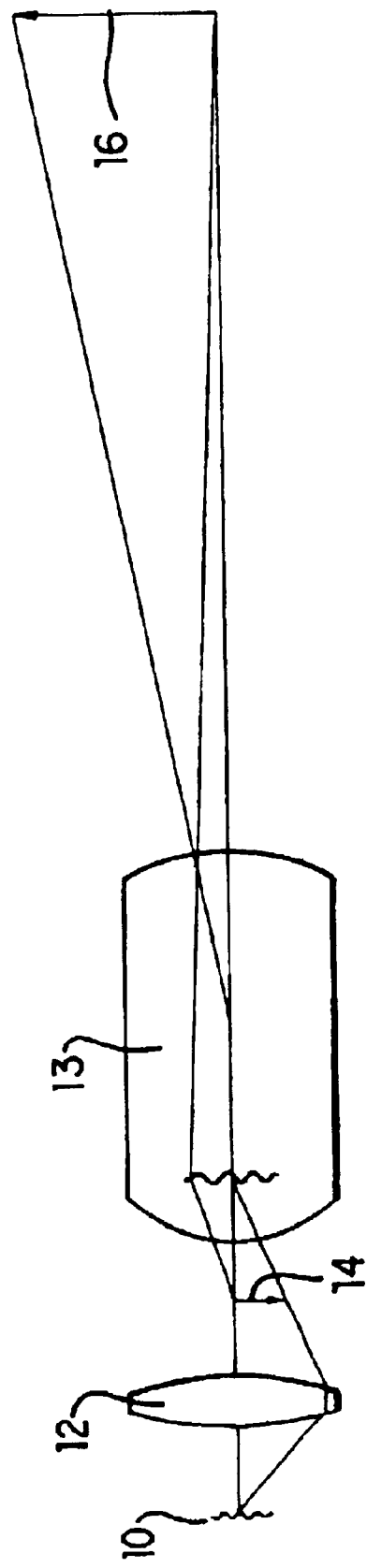
FIG. 4 is a schematic diagram showing an overall projection lens system in which the projection lenses of the present invention can be used. As with FIGS. 1, 2, and 3A, for ease of illustration, this figure does not show the projection lens in its folded configuration. Similarly, the details of the telecentricity of the projection lens are not shown in FIG. 4.

FIGS. 1–3 and Tables 1–3 illustrate representative projection lenses constructed in accordance with the invention.

OHARA designations are used for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1 + [1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–3.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of U2 in the figures and tables represent components (e.g., prism PR) which are used with or are a part of the pixelized panel. They do not constitute part of the projection lens. Surfaces 7 and 8 in the prescription tables are vignetting surfaces which are included in the design process to take account of the folding of the optical axis by the reflective surface. All dimensions given in Tables 1–3 and in Table 4 are in millimeters.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 1–3 by the designation "PP" and the aperture stop is shown by the designation "AS".

The focal lengths of the lens units making up the projection lenses of Tables 1–3 are set forth in Table 4 where $f_1$ is the focal length of U1 and $f_2$ is the focal length of U2. Also set forth in this table are the BFL, $S_{1-2}$, $S_{1-AS}$, and $t_e$ values for these examples.

Table 5 sets forth the lateral color and distortion performance of the examples, where the lateral color performance is given in millimeters and the distortion performance in percent. The full field of view in the direction of the long conjugate for each example is 88°. As set forth in Tables 1–3, each of these examples has an entrance pupil (exit pupil in Tables 1–3) which is telecentric.

The projection lenses of Examples 1–3 thus have the desired structural and performance properties discussed above, which make them particularly well-suited to the manufacture of compact projection televisions and monitors which employ pixelized panels.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperature Diameter |
|---|---|---|---|---|---|
| 1 | a | 68.6903 | 5.00000 | ACRYLIC | 66.95 |
| 2 | ac | 21.5816 | 22.54471 | | 50.28 |
| 3 | | −55.9882 | 2.70000 | S-NSL36 | 40.87 |
| 4 | | 25.0606 | 25.32549 | | 33.35 |
| 5 | | 99.3054 | 5.80000 | S-TIH23 | 32.75 |
| 6 | | −98.3054 | 19.00000 | | 32.39 |
| 7 | | ∞ | 0.00000 | | 22.74 |
| 8 | | ∞ | 20.00000 | | 22.74 |
| 9 | | Aperture stop | 13.34571 | | 14.50 |
| 10 | | 164.5208 | 5.00000 | S-FPL51 | 18.43 |
| 11 | | −20.7868 | 1.40000 | S-TIH53 | 19.06 |
| 12 | | −36.2396 | 17.37473 | | 20.02 |
| 13 | | 51.0935 | 6.00000 | S-FPL51 | 27.97 |
| 14 | | −51.0935 | 0.20000 | | 28.14 |
| 15 | ac | 83.9827 | 4.00000 | ACRYLIC | 27.63 |
| 16 | | 600.0000 | 4.44000 | | 27.07 |
| 17 | | ∞ | 26.00000 | S-BSL7 | 26.03 |
| 18 | | ∞ | 3.00000 | | 23.00 |
| 19 | | ∞ | 3.00000 | S-FSL5 | 23.00 |
| 20 | | ∞ | 0.43968 | | 23.00 |

Symbol Description a - Polynomial asphere
c - Conic section

Conics

| Surface Number | Constant |
|---|---|
| 2 | −9.0000E−01 |
| 15 | −1.2000E+01 |

TABLE 1-continued

Even Polynomial Aspheres

| Surf. No. | D | E | F | G | H | I |
|---|---|---|---|---|---|---|
| 1 | 3.0000E−07 | 7.4044E−10 | 4.9826E−13 | −9.7337E−16 | 5.4334E−19 | 4.1323E−23 |
| 2 | 1.3625E−06 | −1.9071E−09 | 2.7739E−12 | −4.3233E−15 | −1.9743E−17 | 6.2349E−21 |
| 15 | −1.4990E−06 | −1.4775E−08 | 2.6451E−11 | 1.8371E−13 | −1.5357E−15 | 2.9485E−18 |

First Order Data

| | | | |
|---|---|---|---|
| f/number | 2.40 | Overall Length | 834.750 |
| Magnification | −0.0154 | Forward Vertex Distance | 184.570 |
| Object Height | −670.30 | Barrel Length | 184.131 |
| Object Distance | −650.180 | Entrance Pupil Distance | 33.1599 |
| Effective Focal Length | 10.5001 | Exit Pupil Distance | −2209.37 |
| Image Distance | 0.439685 | Stop Diameter | 14.450 |
| Stop Surface Number | 9 | Distance to Stop | 0.00 |

First Order Properties of Elements

| Element Number | Surface Numbers | | Power | f' |
|---|---|---|---|---|
| 1 | 1 | 2 | −0.15141E−01 | −66.048 |
| 2 | 3 | 4 | −0.30366E−01 | −32.932 |
| 3 | 5 | 6 | 0.15897E−01 | 62.903 |
| 4 | 10 | 11 | 0.26767E−01 | 37.360 |
| 5 | 11 | 12 | −0.16807E−01 | −59.498 |
| 6 | 13 | 14 | 0.19130E−01 | 52.273 |
| 7 | 15 | 16 | 0.50695E−02 | 197.26 |

First-Order Properties of Doublets

| Element Number | | Surface Numbers | | Power | f' |
|---|---|---|---|---|---|
| 4 | 5 | 10 | 12 | 0.96527E−02 | 103.60 |

TABLE 2

| Surf. No. | Type | Radius | Thickness | Glass | Clear Aperature Diameter |
|---|---|---|---|---|---|
| 1 | a | 65.0000 | 5.00000 | ACRYLIC | 66.23 |
| 2 | ac | 20.0000 | 23.57996 | | 48.77 |
| 3 | | −48.1592 | 2.30000 | S-BSL7 | 39.47 |
| 4 | | 26.6019 | 19.96874 | | 33.51 |
| 5 | | 112.4195 | 7.00000 | S-LAM66 | 34.54 |
| 6 | | −69.6643 | 19.00000 | | 34.19 |
| 7 | | ∞ | 0.00000 | | 21.11 |
| 8 | | ∞ | 20.00000 | | 21.11 |
| 9 | | Aperture stop | 13.50000 | | 13.60 |
| 10 | | 400.0000 | 6.40000 | S-NSL36 | 17.18 |
| 11 | | −17.8399 | 1.40000 | S-NPH1 | 18.69 |
| 12 | | −35.6614 | 11.21600 | | 20.08 |
| 13 | | 65.2242 | 6.20000 | S-FPL51 | 27.06 |
| 14 | | −38.7852 | 0.20000 | | 27.45 |
| 15 | ac | 61.9356 | 4.00000 | ACRYLIC | 26.99 |
| 16 | | 248.0375 | 4.44000 | | 26.45 |
| 17 | | ∞ | 26.00000 | S-BSL7 | 25.56 |
| 18 | | ∞ | 3.00000 | | 23.00 |
| 19 | | ∞ | 3.00000 | S-FSL5 | 23.00 |
| 20 | | ∞ | 0.96264 | | 23.00 |

Symbol Description a - Polynomial asphere
c - Conic section

Conics

| Surface Number | Constant |
|---|---|
| 2 | −8.0000E−01 |
| 15 | −1.2000E+01 |

TABLE 2-continued

Even Polynomial Aspheres

| Surf. No. | D | E | F | G | H | I |
|---|---|---|---|---|---|---|
| 1 | 8.3311E−08 | 4.8873E−11 | −2.4183E−14 | 1.5006E−16 | 1.2480E−19 | −2.1695E−23 |
| 2 | 1.0891E−06 | −3.0558E−09 | −1.6537E−12 | −1.3816E−14 | 6.1693E−18 | −1.7316E−20 |
| 15 | 2.7425E−06 | −3.2614E−08 | 1.0675E−10 | 3.0153E−13 | −4.7534E−15 | 1.1523E−17 |

First Order Data

| | | | |
|---|---|---|---|
| f/number | 2.40 | Overall Length | 830.609 |
| Magnification | −0.0154 | Forward Vertex Distance | 177.167 |
| Object Height | −670.30 | Barrel Length | 176.205 |
| Object Distance | −653.441 | Entrance Pupil Distance | 32.6682 |
| Effective Focal Length | 10.5406 | Exit Pupil Distance | −592.081 |
| Image Distance | 0.962640 | Stop Diameter | 13.558 |
| Stop Surface Number | 9 | Distance to Stop | 0.00 |

First Order Properties of Elements

| Element Number | Surface Numbers | | Power | f' |
|---|---|---|---|---|
| 1 | 1 | 2 | −0.16464E−01 | −60.737 |
| 2 | 3 | 4 | −0.30560E−01 | −32.722 |
| 3 | 5 | 6 | 0.18427E−01 | 54.267 |
| 4 | 10 | 11 | 0.30275E−01 | 33.031 |
| 5 | 11 | 12 | −0.22063E−01 | −45.325 |
| 6 | 13 | 14 | 0.20087E−01 | 49.782 |
| 7 | 15 | 16 | 0.60242E−02 | 166.00 |

First-Order Properties of Doublets

| Element Number | | Surface Numbers | | Power | f' |
|---|---|---|---|---|---|
| 4 | 5 | 10 | 12 | 0.77986E−02 | 128.23 |

TABLE 3

| Surf. No. | Type | Radius | Thickness | Glass | Clear Aperature Diameter |
|---|---|---|---|---|---|
| 1 | a | 115.7551 | 5.00000 | ACRYLIC | 68.90 |
| 2 | ac | 18.2247 | 30.79387 | | 46.22 |
| 3 | | −39.9900 | 2.30000 | S-FSL5 | 35.54 |
| 4 | | 31.4960 | 10.06629 | | 32.95 |
| 5 | | 70.9800 | 7.00000 | S-LAH60 | 34.89 |
| 6 | | −70.9800 | 19.00000 | | 34.63 |
| 7 | | ∞ | 0.00000 | | 20.99 |
| 8 | | ∞ | 20.00000 | | 20.99 |
| 9 | | Aperture stop | 13.51083 | | 13.30 |
| 10 | | 151.3950 | 5.60000 | S-FSL5 | 17.52 |
| 11 | | −16.3630 | 1.40000 | S-TIH3 | 18.54 |
| 12 | | −44.3200 | 6.94450 | | 20.22 |
| 13 | | 88.8000 | 6.19200 | S-FSL5 | 25.62 |
| 14 | | −32.0600 | 0.20000 | | 26.32 |
| 15 | ac | 80.0000 | 3.80000 | ACRYLIC | 26.30 |
| 16 | | −173.2000 | 7.27437 | | 26.12 |
| 17 | | ∞ | 26.00000 | S-BSL7 | 25.22 |
| 18 | | ∞ | 3.00000 | | 23.00 |
| 19 | | ∞ | 3.00000 | S-FSL5 | 23.00 |
| 20 | | ∞ | 0.44000 | | 23.00 |

Symbol Description a - Polynomial asphere
c - Conic section

Conics

| Surface Number | Constant |
|---|---|
| 2 | −1.7000E+00 |
| 15 | −1.2000E+01 |

TABLE 3-continued

Even Polynomial Aspheres

| Surf. No. | D | E | F | G | H | I |
|---|---|---|---|---|---|---|
| 1 | 1.6355E–06 | –6.7123E–10 | –2.1297E–13 | 4.0158E–16 | –2.2958E–19 | 7.8973E–23 |
| 2 | 2.1311E–05 | –1.1435E–08 | 2.3241E–11 | –2.6878E–14 | –3.3900E–17 | 2.7502E–20 |
| 15 | –1.3745E–06 | –2.6516E–08 | 1.2304E–10 | 2.2021E–13 | –5.5468E–15 | 1.5689E–17 |

First Order Data

| | | | |
|---|---|---|---|
| f/number | 2.40 | Overall Length | 825.104 |
| Magnification | –0.0154 | Forward Vertex Distance | 171.522 |
| Object Height | –670.30 | Barrel Length | 171.082 |
| Object Distance | –653.582 | Entrance Pupil Distance | 30.4941 |
| Effective Focal Length | 10.5063 | Exit Pupil Distance | –287.053 |
| Image Distance | 0.440001 | Stop Diameter | 13.243 |
| Stop Surface Number | 9 | Distance to Stop | 0.00 |

First Order Properties of Elements

| Element Number | Surface Numbers | | Power | f' |
|---|---|---|---|---|
| 1 | 1 | 2 | –0.22441E–01 | –44.561 |
| 2 | 3 | 4 | –0.28056E–01 | –35.644 |
| 3 | 5 | 6 | 0.23117E–01 | 43.258 |
| 4 | 10 | 11 | 0.32761E–01 | 30.524 |
| 5 | 11 | 12 | –0.28149E–01 | –35.525 |
| 6 | 13 | 14 | 0.20416E–01 | 48.981 |
| 7 | 15 | 16 | 0.89783E–02 | 111.38 |

First-Order Properties of Doublets

| Element Number | Surface Numbers | | Power | f' |
|---|---|---|---|---|
| 4 5 | 10 | 12 | 0.45117E–02 | 221.65 |

TABLE 4

| Ex. | $f_0$ | $f_1$ | $f_2$ | BFL | $S_{1-2}$ | $S_{1-AS}$ | $t_e$ |
|---|---|---|---|---|---|---|---|
| 1 | 10.50 | –99.01 | 34.37 | 27.0 | 52.34 | 39.00 | 14.1 |
| 2 | 10.54 | –118.69 | 32.14 | 27.5 | 52.50 | 39.00 | 14.7 |
| 3 | 10.51 | –97.28 | 31.20 | 29.8 | 52.51 | 39.00 | 18.8 |

TABLE 5

| Ex. | $LC_{red-blue}^1$ | $LC_{red-green}^1$ | $LC_{blue-green}^1$ | $LC_{blue-green}^2$ | $D_{max}^3$ | $D_{min}^3$ | $|D_{max}-D_{min}|^3$ |
|---|---|---|---|---|---|---|---|
| 1 | 0.007 | 0.007 | 0.013 | 0.010 | +0.06 | –0.06 | 0.12 |
| 2 | 0.010 | 0.008 | 0.015 | 0.010 | +0.15 | –0.09 | 0.24 |
| 3 | 0.008 | 0.007 | 0.013 | 0.009 | +0.07 | –0.08 | 0.15 |

[1] Over full field in the short conjugate focal plane.
[2] Over 95% of the full field in the short conjugate focal plane.
[3] Over the half field-to-full field range; the magnitude of the distortion was less than 0.2% throughout the field for each of Examples 1–3.

What is claimed is:

1. A projection lens for forming an enlarged image of a pixelized panel on a screen, said projection lens having an optical axis, a long conjugate side, a short conjugate side, and an effective focal length $f_0$, said lens comprising in order from the long conjugate side to the short conjugate side:

(A) a first lens unit having a negative power and comprising a plurality of lens elements, wherein:
 (i) one of the lens elements $L_M$ is a negative lens element of overall meniscus shape which is convex towards the long conjugate side and comprises at least one aspheric surface; and
 (ii) another of the lens elements has an optical surface $S_1$ which constitutes the short conjugate end of the first lens unit;
(B) a reflective surface for folding the projection lens' optical axis; and
(C) a second lens unit having a positive power and comprising a plurality of lens elements, wherein:
 (i) one of the lens elements $L_A$ is a positive lens element which comprises at least one aspheric surface; and
 (ii) another of the lens elements has an optical surface $S_2$ which constitutes the long conjugate end of the second lens unit;
wherein:
 (a) the first and second lens units are the only lens units of the projection lens;
 (b) the projection lens has a field of view in the direction of the long conjugate which is greater than 82 degrees;
 (c) the projection lens is telecentric on the short conjgate side;

(d) the projection lens has an effective back focal length BFL which satisfies the relationship:

$BFL/f_0 > 2.0$;

(e) the projection lens has a mechanical spacing $S_{1-2}$ between $S_1$ and $S_2$ which satisfies the relationship:

$S_{1-2}/f_0 > 3.5$, where the mechanical spacing is the smaller of the center-to-center distance and the edge-to-edge distance between $S_1$ and $S_2$ for an unfolded optical axis; and (f) the projection lens has a lateral color LC in its short conjugate focal plane which satisfies the relationships:

$LC_{red-blue} < 0.0012 \cdot f_0$, $LC_{red-green} < 0.0012 \cdot f_0$, and $LC_{blue-green} < 0.0012 \cdot f_0$, where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.62 micrometers, 0.55 micrometers, and 0.46 micrometers, respectively.

2. The projection lens of claim 1 wherein the projection lens has a percentage distortion D which:

(i) over the full field has a magnitude that is less than 1.0; and (ii) over the half field-to-full field range has a maximum value $D_{max}$ and a minimum value $D_{min}$ which satisfy the relationship:

$|D_{max} - D_{min}| < 0.4$.

3. The projection lens of claim 1 wherein the projection lens comprises an aperture stop between the reflective surface and the second lens unit.

4. The projection lens of claim 3 wherein the spacing $S_{1-AS}$ between the center of $S_1$ and the center of the aperture stop satisfies the relationship:

$S_{1-AS}/f_0 > 3.5$.

5. The projection lens of claim 1 wherein $L_M$ has a center thickness $t_c$ and an edge thickness $t_e$ which satisfy the relationship:

$t_e/t_c < 3.0$, where $t_e$ is determined at the clear aperture of the short conjugate surface of $L_M$.

6. The projection lens of claim 1 wherein:

(i) the second lens unit consists of first and second subunits, the second subunit being on the short conjugate side of the second lens unit; and (ii) the projection lens can be focused by moving either the entire second lens unit or just the second subunit.

7. The projection lens of claim 1 wherein the second lens unit comprises at least one lens element which is composed of an anomalous dispersion glass.

8. The projection lens of claim 1 wherein an axial marginal ray traced through the projection lens from the projection lens' short conjugate focal plane intersects each lens surface of the projection lens at an angle of incidence that is greater than 1.5 degrees except for (i) the lens surfaces of $L_M$ and (ii) any lens surfaces which are on the long conjugate side of $L_M$ for which the angle of incidence may be greater than, less than, or equal to 1.5 degrees.

9. The projection lens of claim 1 wherein the total number of lens elements in the projection lens is less than eight.

10. The projection lens of claim 9 wherein two of the lens elements are in the form of a cemented doublet.

11. The projection lens of claim 1 wherein in order from the long conjugate side to the short conjugate side, the first and second lens units together comprise the following seven lens elements:

(1) $L_M$;
(2) a biconcave negative lens element;
(3) a first biconvex positive lens element which comprises $S_1$;
(4) a second biconvex positive lens element which comprises $S_2$;
(5) a negative lens element;
(6) a biconvex positive lens element; and
(7) $L_A$;

wherein the second biconvex positive lens element and the negative lens element form a color-correcting doublet.

12. A projection lens system comprising:

(a) a pixelized panel; and
(b) the projection lens of claim 1.

13. The projection lens systems of claim 12 further comprising an illumination system which comprises a light source and illumination optics which forms an image of the light source.

14. The projection lens system of claim 13 wherein the output of the illumination optics forms a virtual aperture stop for the projection lens.

15. A projection lens for forming an enlarged image of a pixelized panel on a screen, said projection lens having an optical axis, a long conjugate side, a short conjugate side, and an effective focal length $f_0$, said lens comprising in order from the long conjugate side to the short conjugate side:

(A) a first lens unit having a negative power and consisting in order from the long conjugate side to the short conjugate side of:

(1) a negative lens element $L_M$ of overall meniscus shape which is convex towards the long conjugate side and comprises at least one aspheric surface;
(2) a biconcave negative lens element; and
(3) a biconvex positive lens element which has an optical surface $S_1$ which constitutes the short conjugate end of the first lens unit;

(B) a reflective surface for folding the projection lens' optical axis; and (C) a second lens unit having a positive power and consisting in order from the long conjugate side to the short conjugate side of:

(1) a color correcting doublet which consists of: (i) a biconvex positive lens element which has an optical surface $S_2$ which constitutes the long conjugate end of the second lens unit and (ii) a negative lens element;
(2) a biconvex positive lens element $L_{BC}$; and
(3) a positive lens element $L_A$ which comprises at least one aspheric surface;

wherein:

(a) the first and second lens units are the only lens units of the projection lens;
(b) the projection lens has a field of view in the direction of the long conjugate which is greater than 82 degrees;

(c) the projection lens is telecentric on the short conjugate side;

(d) the projection lens has an effective back focal length BFL which satisfies the relationship:

$BFL/f_0 > 2.0$; and (e) the projection lens has a spacing $S_{1-2}$ between the center of $S_1$ and the center of $S_2$ which satisfies the relationship:

$S_{1-2}/f_0 > 3.5$.

16. The projection lens of claim 15 wherein the projection lens comprises an aperture stop between the reflective surface and the second lens unit and the spacing $S_{1-AS}$ between the center of $S_1$ and the center of the aperture stop satisfies the relationship:

$S_{1-AS}/f_0 > 3.5$.

17. The projection lens of claim 15 wherein $L_M$ has a center thickness $t_c$ and an edge thickness $t_e$ which satisfy the relationship:

$t_e/t_c > 3.0$, where $t_e$ is determined at the clear aperture of the short conjugate surface of $L_M$.

18. The projection lens of claim 15 wherein the projection lens can be focused by moving either the entire second lens unit or just the combination of $L_{BC}$ and $L_A$.

19. The projection lens of claim 15 wherein the second lens unit comprises at least one lens element which is composed of an anomalous dispersion glass.

20. A projection lens system comprising:

(a) a pixelized panel; and (b) the projection lens of claim 15.

* * * * *

UNITED STATES PATENT AND TRADEMARK OFFICE
CERTIFICATE OF CORRECTION

PATENT NO. : 6,853,493 B2
DATED : February 8, 2005
INVENTOR(S) : Kreitzer, Melvyn H.

It is certified that error appears in the above-identified patent and that said Letters Patent is hereby corrected as shown below:

Column 10,
Table 1, in row 5, under the heading "Radius" please delete "99.3054" and insert -- 98.3054 --.

Column 20,
Line 5, delete "$t_e/t_c > 3.0$" and insert -- $t_e/t_c \leq 3.0$ --.

Signed and Sealed this

Seventeenth Day of May, 2005

JON W. DUDAS
*Director of the United States Patent and Trademark Office*